US012717452B2

(12) United States Patent
Wang et al.

(10) Patent No.: US 12,717,452 B2
(45) Date of Patent: Aug. 25, 2026

(54) DISPLAY PANEL AND DISPLAY APPARATUS

(71) Applicants: Chengdu BOE Optoelectronics Technology Co., Ltd., Chengdu (CN); BOE Technology Group Co., Ltd., Beijing (CN)

(72) Inventors: Wei Wang, Beijing (CN); Siyu Wang, Beijing (CN); Yi Zhang, Beijing (CN)

(73) Assignees: Chengdu BOE Optoelectronics Technology Co., Ltd., Chengdu (CN); BOE Technology Group Co., Ltd., Beijing (CN)

( * ) Notice: Subject to any disclaimer, the term of this patent is extended or adjusted under 35 U.S.C. 154(b) by 256 days.

(21) Appl. No.: 18/576,355

(22) PCT Filed: Mar. 16, 2023

(86) PCT No.: PCT/CN2023/081988

§ 371 (c)(1),
(2) Date: Jan. 3, 2024

(87) PCT Pub. No.: WO2024/187473

PCT Pub. Date: Sep. 19, 2024

(65) Prior Publication Data

US 2025/0110597 A1 Apr. 3, 2025

(51) Int. Cl.

*G06F 3/044* (2006.01)
*G06F 3/041* (2006.01)

(52) U.S. Cl.

CPC .......... *G06F 3/0446* (2019.05); *G06F 3/0412* (2013.01); *G06F 3/0448* (2019.05);

(Continued)

(58) Field of Classification Search

CPC .... G06F 3/0412; G06F 3/0446; G06F 3/0448; G06F 3/047; G06F 3/04164;

(Continued)

(56) References Cited

U.S. PATENT DOCUMENTS

2019/0121479 A1* 4/2019 Lee .......................... G06F 3/041
2021/0081063 A1* 3/2021 Ye .......................... H10K 59/353

(Continued)

FOREIGN PATENT DOCUMENTS

CN 110968220 A 4/2020
CN 115617201 A 1/2023

(Continued)

*Primary Examiner* — William Boddie
*Assistant Examiner* — Saifeldin E Elnafia
(74) *Attorney, Agent, or Firm* — IPro, PLLC

(57) ABSTRACT

Embodiments of the present disclosure provide a display panel and a display apparatus. The display panel includes a display substrate and a touch layer disposed on a side of the display substrate proximal to a light-exiting side of the display panel; the display panel is provided with a bendable region and a non-bendable region connected to each other; and the touch layer includes a plurality of touch wires intersected with one another to form a mesh structure, the mesh structure being provided with a plurality of fractures, the plurality of fractures including a plurality of first fractures in the bendable region, truncation directions of the plurality of first fractures including at least one of the following directions: a direction parallel to a length direction of the bendable region, and a direction perpendicular to the length direction of the bendable region.

16 Claims, 7 Drawing Sheets

(52) U.S. Cl.
CPC ............ *G06F 3/041* (2013.01); *G06F 3/0443* (2019.05); *G06F 3/0445* (2019.05); *G06F 2203/04102* (2013.01); *G06F 2203/04111* (2013.01); *G06F 2203/04112* (2013.01)

(58) Field of Classification Search
CPC . G06F 2203/04102; G06F 2203/04111; G06F 2203/04112; G06F 3/0443; G06F 3/0445; G06F 3/041
See application file for complete search history.

(56) References Cited

U.S. PATENT DOCUMENTS

2022/0100303 A1* 3/2022 Lee ........................ G06F 3/0416
2022/0197418 A1 6/2022 Liu et al.
2023/0123648 A1* 4/2023 Cai ........................ G06F 3/0412
257/40
2024/0053842 A1 2/2024 Zhang et al.
2025/0315133 A1* 10/2025 Tang ..................... G06F 3/0443

FOREIGN PATENT DOCUMENTS

CN 115756194 A 3/2023
WO 2022222615 A1 10/2022

* cited by examiner

DISPLAY PANEL AND DISPLAY APPARATUS

The present disclosure is a U.S. national stage of international application No. PCT/CN2023/081988, filed on Mar. 16, 2023, the disclosure of which is herein incorporated by reference in its entirety.

TECHNICAL FIELD

Embodiments of the present disclosure relate to the field of display technologies, and in particular to a display panel and a display apparatus.

BACKGROUND

Display apparatuses, such as mobile phones, tablet computers and other electronic devices, have been widely used in life. A display panel is an important component of the display apparatus.

SUMMARY

The embodiments of the present disclosure provide a display panel and a display apparatus. Technical solutions are described below.

In some embodiments, a display panel is provided. The display panel is provided with a bendable region and a non-bendable region connected to the bendable region; the display panel includes a display substrate and a touch layer disposed on a side of the display substrate proximal to a light-exiting side of the display panel; and the touch layer includes a plurality of touch wires intersected with one another to form a mesh structure, the mesh structure being provided with a plurality of fractures, the plurality of fractures including a plurality of first fractures in the bendable region, truncation directions of the plurality of first fractures including at least one of the following directions: a direction parallel to a length direction of the bendable region, and a direction perpendicular to the length direction of the bendable region.

In some embodiments, the display substrate includes a plurality of light-emitting units, the mesh structure includes a plurality of first grids, and each of the first grids surrounds one of the light-emitting units; and the first fracture is disposed in at least one of the following positions: at an intersection of every two adjacent sides of the first grid, and between every two adjacent first grids in the length direction of the bendable region; at an intersection of every two adjacent sides of the first grid, and between every two adjacent first grids in a direction perpendicular to the length direction of the bendable region; and at the middle of one side of the first grid.

In some embodiments, the first fracture has two opposite fracture surfaces, and for the first fracture disposed at the intersection of every two adjacent sides of the first grid, an included angle between an extension direction of any one of the two adjacent sides and the fracture surface is an obtuse angle.

In some embodiments, the display panel further includes a color film layer disposed on a side of the touch layer distal from the display substrate: a black matrix of the color film layer is provided with a plurality of first openings therein: the display substrate further includes a pixel definition layer provided with a plurality of second openings; and the non-bendable region includes a photosensitive region, the plurality of first openings and the plurality of second openings being both disposed in the photosensitive region, the plurality of second openings being in one-to-one correspondence with the plurality of first openings, an orthographic projection of each first opening onto the touch layer being respectively disposed within an orthographic projection of the second opening corresponding to the first opening onto the touch layer.

In some embodiments, the mesh structure further includes a plurality of second grids disposed in the photosensitive region, the plurality of second grids being connected between every two adjacent first grids; and orthographic projections of the first opening and the second opening corresponding to the first opening onto the touch layer are disposed within a region surrounded by the second grids.

In some embodiments, the first grids in the photosensitive region are all hexagonal, and the first grid of the hexagonal includes six sides sequentially connected end to end; and the second grid is rectangular, and the second grid includes four sides sequentially connected end to end, the four sides of the second grid being respectively in common with sides of the four adjacent first grids of the hexagonal.

In some embodiments, the plurality of light-emitting units include a first light-emitting unit, a second light-emitting unit and a third light-emitting unit, a light-emitting area of the first light-emitting unit being larger than that of the second light-emitting unit and larger than that of the third light-emitting unit; and a first side of the second grid is in common with the first grid surrounding the first light-emitting unit, and in the second grid, the width of the first side is smaller than widths of sides of the second grid other than the first side.

In some embodiments, in the second grid, the width of the first side ranges from 2.8 μm to 2.9 μm, and the widths of the sides of the second grid other than the first side range from 3.4 μm to 3.6 μm.

In some embodiments, the four sides of the second grid are of equal width.

In some embodiments, the plurality of fractures further include a plurality of second fractures, the second fracture being disposed on at least part of the four sides of the second grid, a direction of the second fracture being perpendicular to an extension direction of the side where the second fracture is disposed.

In some embodiments, the plurality of light-emitting units include a first light-emitting unit, a second light-emitting unit and a third light-emitting unit, a light-emitting area of the first light-emitting unit being larger than that of the second light-emitting unit and larger than that of the third light-emitting unit; and in the photosensitive region, the first grid surrounding the first light-emitting unit is hexagonal and has a group of opposite sides vacant, and the first grids surrounding the second light-emitting unit and the third light-emitting unit are hexagonal; and the second grid is rectangular and has one side vacant, and the vacant side of the second grid is in common with the vacant side of the first grid.

In some embodiments, the first light-emitting unit is a blue light-emitting unit.

In some embodiments, the plurality of fractures further include a plurality of third fractures disposed in the non-bendable region other than the photosensitive region, the plurality of third fractures including at least one of the following fractures: a fracture of which a fracture direction is parallel to the length direction of the bendable region; a fracture of which a fracture direction is perpendicular to the length direction of the bendable region; and a fracture of which a fracture direction forms a non-90-degree included angle with the length direction of the bendable region.

In some embodiments, the touch layer includes a first metal layer and a second metal layer laminated in sequence: the first metal layer includes a plurality of first touch electrodes and a plurality of second touch electrodes, insulated from each other, the plurality of first touch electrodes and the plurality of second touch electrodes being separated by at least part of the plurality of fractures, and the second metal layer includes a plurality of connection bridges:

the plurality of first touch electrodes are distributed in a first direction, each of the first touch electrodes includes a plurality of first touch electrode blocks, the plurality of first touch electrode blocks are arranged in a second direction, and every two first touch electrode blocks adjacent to each other in the second direction are connected by means of one of the connection bridges; and the plurality of second touch electrodes are distributed in a second direction, each of the second touch electrodes includes a plurality of second touch electrode blocks and a plurality of connection lines, the plurality of second touch electrode blocks are arranged in the first direction, and every two second touch electrode blocks adjacent to each other in the first direction are connected by means of at least two of the connection lines;

wherein the second direction is intersected with the first direction, and a dimension of the display panel in the first direction is larger than that of the display panel in the second direction.

In some embodiments, a display apparatus is provided. The display apparatus includes any one of display panels described above and a power supply circuit, the power supply circuit being configured to supply power to the display panel.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

For clearer descriptions of the objectives, technical solutions, and advantages of the present disclosure, embodiments of the present disclosure are described in detail hereinafter with reference to the accompanying drawings.

Unless otherwise defined, technical terms or scientific terms used in the present application shall be taken to mean the ordinary meanings as understood by the ordinary skill in the art to which the present application belongs. The terms "first", "second", "third" and the like used in the description and the claims of the patent application do not denote any order, quantity, or importance, but are merely used to distinguish different components. Similarly, the term "one", "a", or the like is not intended to limit the number, but to denote the number of at least one. The term "comprise", "include", or the like is intended to mean that the elements or objects present before said term cover the elements or objects or equivalents listed after said term, without excluding other elements or objects. The term "connection", "connected", or the like is not limited to a physical or mechanical connection, and may include electrical connection and the connection may be direct or indirect. The terms "upper", "lower", "left", "right", "top", "bottom" and the like are only used to indicate the relative positional relationship, and when the absolute position of a described object changes, the relative positional relationship may also change accordingly.

The present disclosure provides a display apparatus, and the display apparatus may be any product or component having a folding, touch-control, and display function, such as a notebook computer, a mobile phone, and a wearable device.

Figure 1:
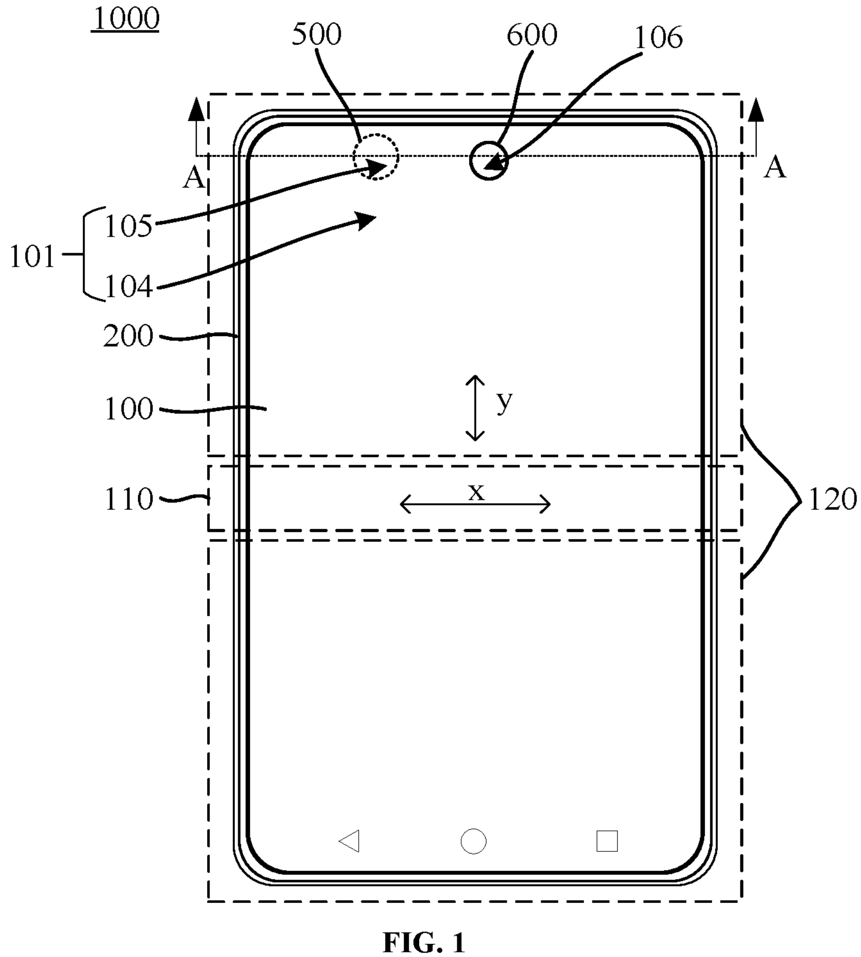
FIG. 1 is a top view of a display apparatus according to some embodiments of the present disclosure.

FIG. 1 is a top view of a display apparatus according to some embodiments of the present disclosure. As shown in FIG. 1, the display apparatus 1000 includes a display panel 100, and the display panel 100 is provided with a bendable region 110 and a non-bendable region 120 connected to the display panel 100.

In the embodiments as shown in FIG. 1, the display panel 100 is provided with two non-bendable regions 120, and the bendable region 110 is connected between the two non-bendable regions 120. A length direction x of the bendable region 110 is perpendicular to an arrangement direction y of the bendable region 110 and the non-bendable region 120. In some embodiments, the display panel 100 is provided with more non-bendable regions, for example, three, and the adjacent non-bendable regions are connected by one bendable region 110. The following explanation is made by taking the fact that the display panel 100 is provided with two non-bendable regions 120 and the bendable region 110 is connected between the two non-bendable regions 120 as an example.

As shown in FIG. 1, the length direction x of the bendable region 120 is perpendicular to the length direction of the display panel 100. In some embodiments, the length direction x of the bendable region 120 is the same as the length direction of the display panel 100.

Figure 2:
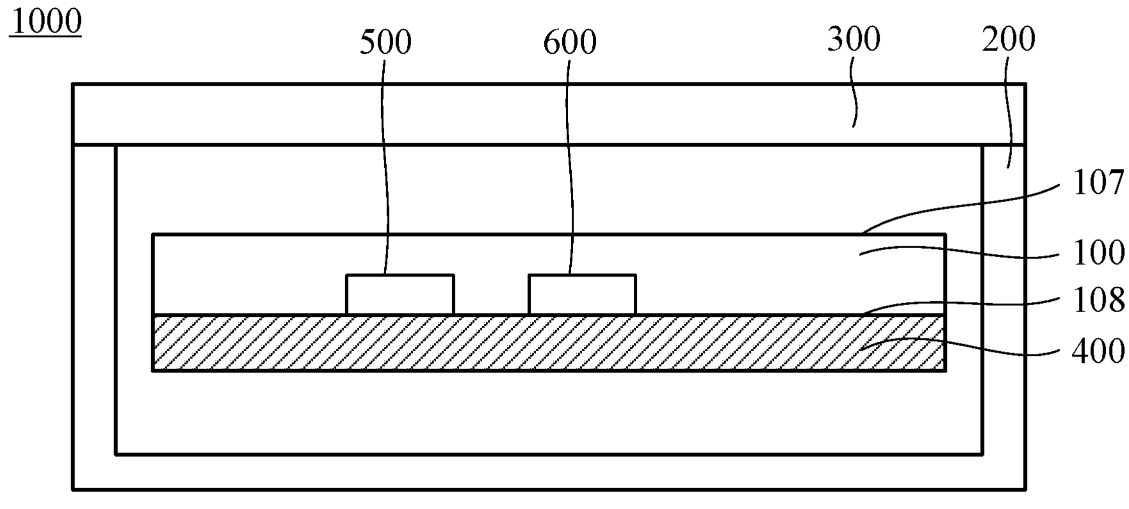
FIG. 2 is a sectional view of the display apparatus according to some embodiments of the present disclosure.

FIG. 2 is a sectional view of the display apparatus according to some embodiments of the present disclosure, and FIG. 2 is a sectional view along line AA in FIG. 1. In some embodiments, as shown in FIG. 1 and FIG. 2, the display panel 100 includes a light-exiting side 107 and a non-light-exiting side 108 opposite to each other. The display apparatus 1000 further includes a housing 200, a cover plate 300, a circuit board 400, a photosensitive component 500, a camera 600, and other electronic accessories.

As shown in FIG. 1 and FIG. 2, the photosensitive component 500 and the camera 600 are disposed on the non-light-exiting side 108 of the display panel 100 to increase the screen ratio. The photosensitive component 500 includes at least one of an infrared sensor, a distance sensor, a fingerprint recognition module, and a brightness adjustment module.

As shown in FIG. 2, a longitudinal section of the housing 200 is U-shaped. The display panel 100 and the circuit board 400 are arranged within the housing 200, and the cover plate 300 is arranged at an opening of the housing 200.

There are many types of display panels 100, which may be selected and set according to actual needs.

In some embodiments, the display panel 100 is an organic light emitting diode (OLED) display panel, a quantum dot light emitting diode (QLED) display panel, etc., which is not specifically limited in the present disclosure.

The following explanation is made by taking the display panel 100 being an OLED display panel as an example.

Figure 3:
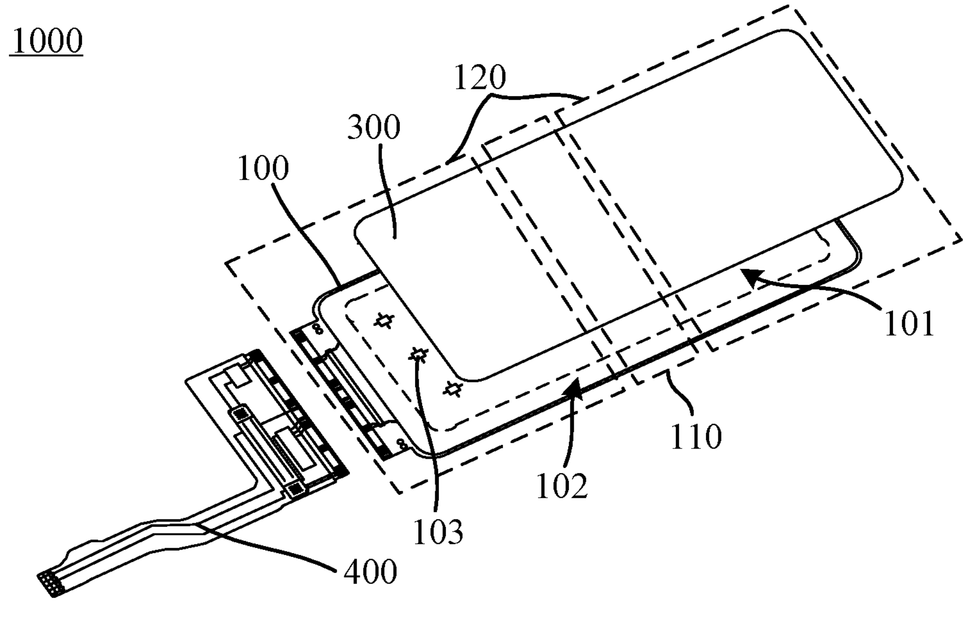
FIG. 3 is a schematic diagram of a perspective exploded structure of the display apparatus according to some embodiments of the present disclosure.

FIG. 3 is a schematic diagram of a perspective exploded structure of the display apparatus according to some embodiments of the present disclosure. As shown in FIG. 3, the display panel 100 is provided with a display region 101 and a peripheral region 102 arranged on at least one side of the display region 101. FIG. 3 is illustrated by taking the peripheral region 102 surrounding the display region 101 as an example.

The display region 101 is a region for displaying images, and a plurality of sub-pixels 103 are arranged in the display region 101. The peripheral region 102 is a region where no image is displayed, and display driving circuits, such as a gate driving circuit and a source driving circuit, are arranged in the peripheral region 102.

In some embodiments, as shown in FIG. 1, the display region 101 includes a main display region 104 and a photosensitive region 105, the photosensitive region 105 is disposed in the non-bendable region 120, and the main display region 104 surrounds the photosensitive region 105. The photosensitive component 500 is disposed on the non-light-exiting side 108 of the photosensitive region 105 of the display panel 100. As shown in FIG. 1 and FIG. 3, the photosensitive region 105 is disposed at the top of the display region 101, i.e., a portion of the display region 101 distal to a binding part of the display panel 100. In some embodiments, the photosensitive region 105 is also disposed at other positions of the display region 101, for example, at the bottom of the display region 101, i.e., a portion of the display region 101 proximal to the binding part of the display panel 100, which is not repeated herein.

It should be noted that the photosensitive region 105 may be either circular, polygonal and irregular, which is not repeated herein.

In some examples, as shown in FIG. 1, the display panel 100 is also provided with a camera region 106, and the camera 600 is disposed on the lower side of the camera region 106 of the display panel 100.

The display region 101 surrounds the camera region 106, and the camera region 106 is disposed at the top of the display region 101, i.e., the portion of the display region 101 distal to the binding part of the display panel 100, or at other positions of the display region 101, for example, at the bottom of the display region 101, i.e., the portion of the display region 101 proximal to the binding part of the display panel 100, which is not repeated herein.

Here, the binding part of the display panel 100 refers to a portion connected to the circuit board 400.

Figure 4:
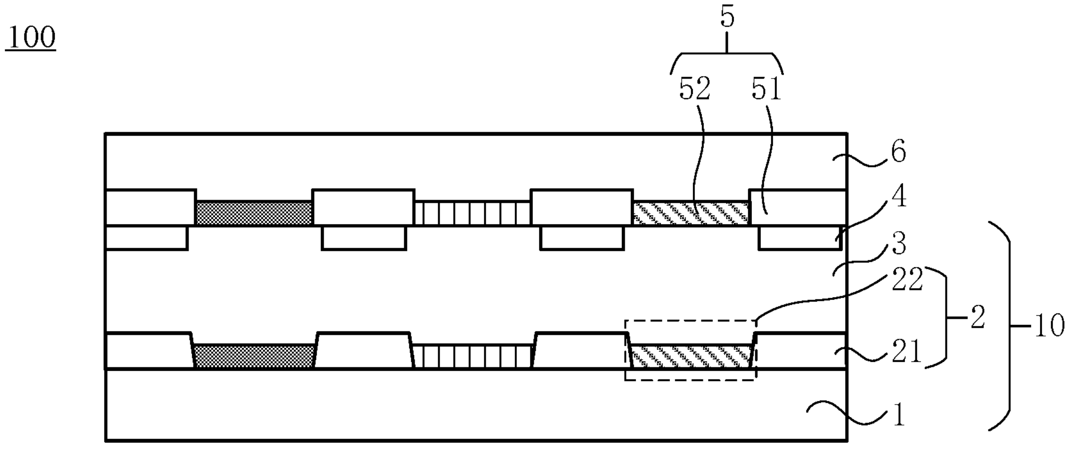
FIG. 4 is a hierarchical diagram of a display panel according to some embodiments of the present disclosure.

FIG. 4 is a hierarchical diagram of the display panel according to some embodiments of the present disclosure. As shown in FIG. 4, the display panel 100 includes a display substrate 10 and a touch layer 4, and the touch layer 4 is disposed on a side of the display substrate 10 proximal to the light-exiting side 107 of the display panel 100.

The touch layer 4 includes a plurality of driving electrodes and a plurality of sensing electrodes. An electric charge may be induced on the sensing electrodes by pulses or alternating voltages applied by a touch chip on the circuit board 400 (illustrated in FIG. 3) to the driving electrodes, and the quantity of electric charge induced may be susceptible to external influences (e.g., touch or approaching of a finger). That is, when a finger touches or approaches a capacitive node, a capacitance change may occur at the capacitive node, and the touch chip on the circuit board 400 may measure the capacitance change by means of the sensing electrodes, and determine the position where the finger touches or approaches according to the measured capacitance change in the whole touch layer 4. By arranging the touch layer 4 in the display panel 100, the display panel 100 may have a touch function.

The display substrate 10 includes a driving backplane 1, a light-emitting function layer 2, and an encapsulation layer 3 laminated in sequence. The light-emitting function layer 2 includes a pixel definition layer 21 and a plurality of light-emitting units 22. The pixel definition layer 21 is provided with a plurality of openings therein, and each opening is provided with one light-emitting unit 22 therein. The plurality of light-emitting units 22 are arranged in an array. Each light-emitting unit 22 belongs to one sub-pixel 103 of the display panel 100. The plurality of light-emitting units 22 are electrically connected to the driving backplane 1 for emitting light under the control of the driving backplane 1. The encapsulation layer 3 covers the light-emitting function layer 2 and is configured to encapsulate the plurality of light-emitting units 22. The touch layer 4 is disposed on the side of the encapsulation layer 3 distal to the driving backplane 1.

The display panel 100 further includes a color film layer 5, and the color film layer 5 is disposed on the side of the touch layer 4 distal to the encapsulation layer 3. This way of arranging the color film laver 5 on the encapsulation layer 3 is called color on encapsulation (COE, integrating a color film or a color filter on the encapsulation layer). The color film layer 5 includes a black matrix 51 and a plurality of color resistance blocks 52, the black matrix 51 is disposed between any two adjacent color resistance blocks 52, and the plurality of color resistance blocks 52 are in one-to-one correspondence with the plurality of light-emitting units 22.

In some embodiments, the display panel further includes an over coat (OC) layer 6, and the OC layer is arranged on the side of the color film layer 5 distal to the encapsulation layer 3. In some embodiments, the OC layer 6 is a transparent resin layer for protecting the color film layer 5 and playing a role of planarization.

In the embodiments of the present disclosure, the touch layer 4 includes a plurality of touch wires, and the plurality of touch wires are intersected to form a mesh structure. The mesh structure is provided with a plurality of fractures. The plurality of fractures are divided into two kinds, one kind for dividing the mesh structure into a plurality of touch electrodes, such as driving electrodes and sensing electrodes, other kind for preventing the touch wires from being visible under strong light. When the touch layer is provided with a plurality of long touch wires in a regular arrangement, the intensity of reflected light is strong under strong light, which causes the touch wires to be visible. By making the fractures at random positions on these regularly arranged touch wires, the reflectivity of the touch wires is reduced and the touch wires are prevented from being visible under strong light.

Figure 5:
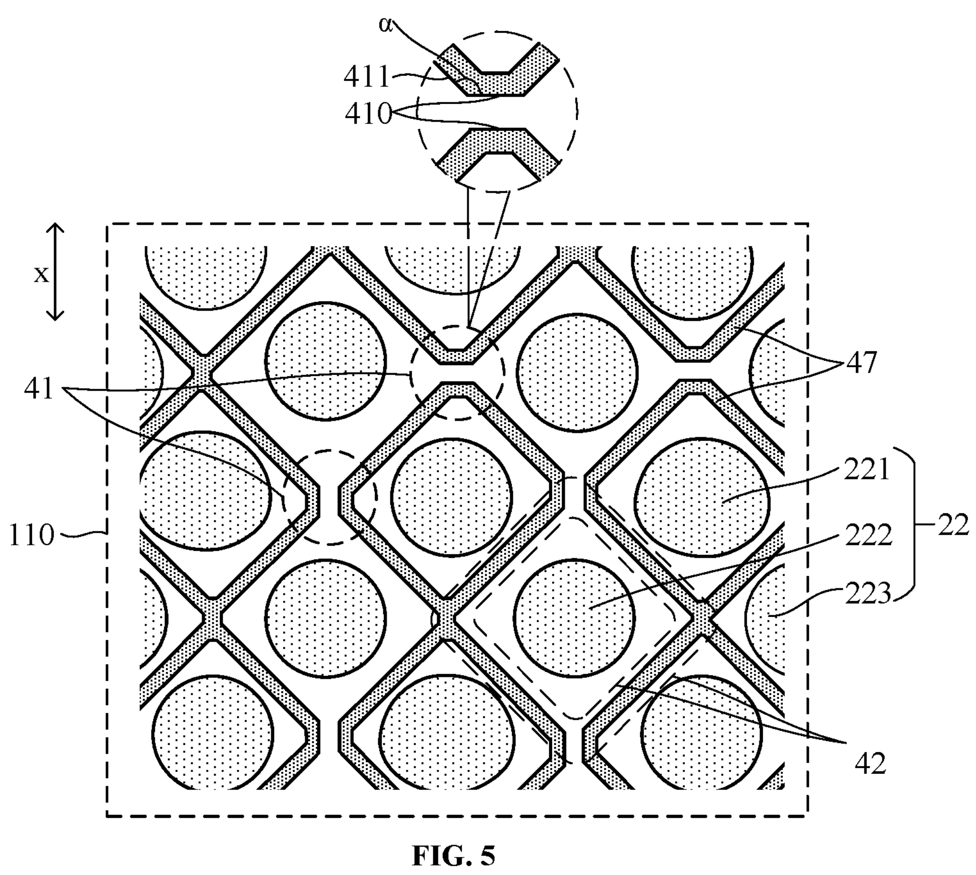
FIG. 5 is a top view of a bendable region of the display panel according to some embodiments of the present disclosure.

FIG. 5 is a top view of the bendable region of the display panel according to some embodiments of the present disclosure, which shows the structures and relative positions of the touch wires and the light-emitting units in the touch layer in the bendable region. As shown in FIG. 5, in the bendable region 110, the mesh structure is provided with a plurality of first fractures 41, and truncation directions of the plurality of first fractures 41 include at least one of the following directions: a direction parallel to a length direction x of the bendable region 110 and a direction perpendicular to the length direction x of the bendable region 110.

In the embodiments of the present disclosure, the fracture is provided with two opposite fracture surfaces, and the truncation direction of the fracture is perpendicular to the arrangement directions of the two fracture surfaces and parallel to the fracture surfaces.

For example, for the first fracture 41 in the enlarged portion of FIG. 5, the first fracture 41 is provided with two opposite fracture surfaces 410, and the two fracture surfaces 410 are arranged in the length direction x of the bendable region 110 and are both perpendicular to the length direction x of the bendable region 110. Therefore, the truncation direction of the first fracture 41 is parallel to the length direction x of the bendable region 110.

In some practices, the truncation direction of the fracture in the bendable region 110 forms an acute angle with the length direction x of the bendable region 110, i.e., the truncation direction of the fracture in the bendable region 110 is neither parallel nor perpendicular to the length direction x of the bendable region 110, and cracks are likely to occur when the display panel 100 is bent. In the embodiments of the present disclosure, when the truncation direction of the first fracture 41 of the bendable region 110 is parallel or perpendicular to the length direction x of the bendable region 110, the problem that the fracture cracks when the display panel is bent can be solved, so that the bending resistance of the product is improved.

In the embodiments of the present disclosure, the mesh structure includes a plurality of first grids 42, and each first grid 42 surrounds one light-emitting unit 22. The first grid 42 is composed of a plurality of touch wires sequentially connected end to end. The first grid 42 is not limited in shape in the embodiments of the present disclosure, and may be quadrilateral, hexagonal, etc.

In the embodiments of the present disclosure, as shown in FIG. 5, the first grid 42 disposed in the bendable region 110 is quadrilateral, such as diamond-shaped or rectangular. The quadrilateral first grid 42 includes four sides connected end to end.

In FIG. 5, part of the first fractures 41 are disposed at the intersection of every two adjacent sides of the first grid 42 and between every two adjacent first grids 42 in the length direction x of the bendable region 110. Other first fractures 41 are disposed at the intersection of every two adjacent sides of the first grid 42 and between every two adjacent first grids 42 in the direction perpendicular to the length direction x of the bendable region 110.

In some embodiments, the non-bendable region 105 is provided with parts of the first fractures 41 disposed at the middle of one side of the first grid 42 (not shown in the figures). The diversity of the positions of the first fracture 41 can further prevent the touch wires from being seen under strong light.

In the embodiments of the present disclosure, as shown in FIG. 5, for the first fracture 41 disposed at the intersection of every two adjacent sides of the first grid 42, an included angle α between the extension direction of any one of the two adjacent sides and the fracture surface 410 is an obtuse angle, which effectively reduces or avoids the impact of static electricity on the touch wires, reduces the risk of a failure of touch performance caused by electro-static discharge (ESD), and achieves the purpose of improving the anti-ESD ability, thereby avoiding decrease of the product yield due to ESD and achieving the purpose of improving the product yield.

In some embodiments, the width of the first fracture 41 is 5 μm to 5.5 μm, for example, 5.2 μm. Here, the width of the first fracture 41 refers to the distance between the two fracture surfaces 110 of the first fracture 41.

In some practices, in the display panel 100, the photosensitive region 105 where the photosensitive component 500 is disposed is low in comprehensive transmittance, and the photosensitive component 500 may receive less external ambient light and thus is low in photosensitive sensitivity, which adversely affects the automatic brightness adjustment function and the touch-control function of the display panel 100. Here, the comprehensive transmittance refers to the product of the transmittance of the display panel 100 and the aperture ratio of the photosensitive opening in the photosensitive region 105. Since the black matrix 51 and the pixel definition layer 21 are opaque, the display panel 100 has low transmittance at the photosensitive region 105, resulting in low comprehensive transmittance of the photosensitive region 105. Therefore, the transmittance of the display panel 100 in the photosensitive region 105 can be improved by forming holes in the black matrix 51 and the pixel definition layer 21, so that the comprehensive transmittance of the display panel 100 is improved.

In some embodiments, as shown in FIG. 5, the light-emitting units of different colors in the plurality of light-emitting units 22 have different light-emitting areas. Here, the light-emitting area of the light-emitting unit may refer to the area of a light-emitting layer of the light-emitting unit.

For example, the plurality of light-emitting units 22 include a first light-emitting unit 221, a second light-emitting unit 222 and a third light-emitting unit 223, and the first light-emitting unit 221, the second light-emitting unit 222 and the third light-emitting unit 223 are light-emitting units of different colors. A light-emitting area of the first light-emitting unit 221 is larger than that of the second light-emitting unit 222 and larger than that of the third light-emitting unit 223.

In some embodiments, the first light-emitting unit 221 is a blue light-emitting unit. One of the second light-emitting unit 222 and the third light-emitting unit 223 is a red light-emitting unit and the other is a green light-emitting unit.

In some embodiments, the light-emitting units 22 of different colors have equal light-emitting areas.

In the embodiments of the present disclosure, one pixel includes a plurality of sub-pixels, there are one or more sub-pixels of the same color in the same pixel, and the numbers of the sub-pixels of different colors are the same or different. For example, in the example shown in FIG. 5, each pixel includes one blue sub-pixel, one red sub-pixel, and two green sub-pixels. In some embodiments, there is only one sub-pixel of each color in the same pixel.

Figure 6:
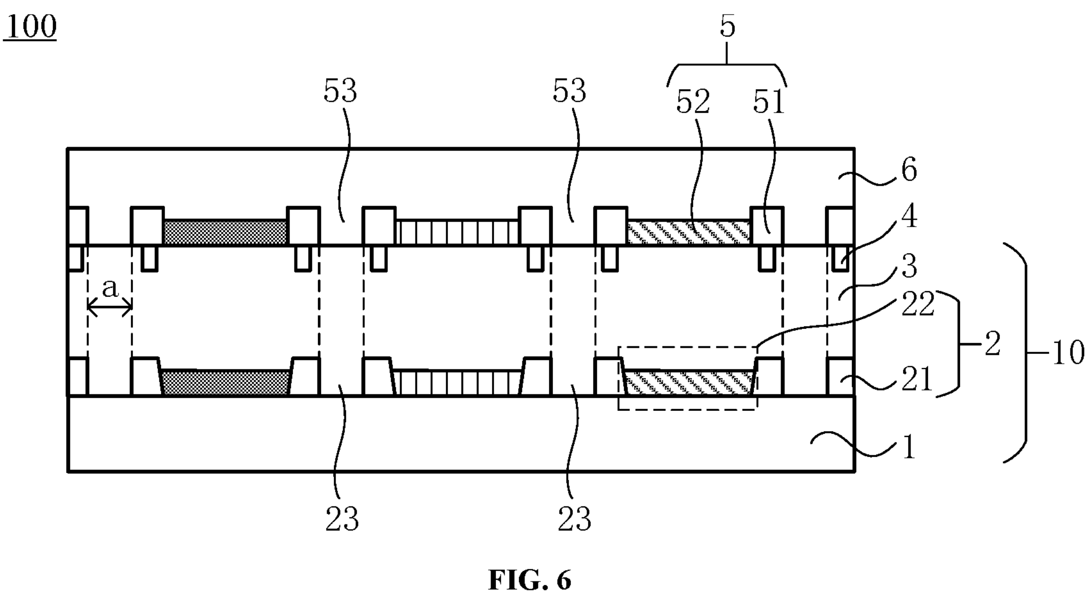
FIG. 6 is a hierarchical diagram of a photosensitive region of the display panel according to some embodiments of the present disclosure.

FIG. 6 is a hierarchical diagram of the photosensitive region of the display panel according to some embodiments of the present disclosure. As shown in FIG. 6, the black matrix 51 is provided with a plurality of first openings 53 therein. The pixel definition layer 21 is provided with a plurality of second openings 23 therein. The plurality of second openings 23 are in one-to-one correspondence with the plurality of first openings 53. An orthographic projection of each first opening 53 onto the touch layer 4 is in coincidence with an orthographic projection of the corresponding second opening 23 onto the touch layer 4.

In this case, the cross-sectional shape of the first opening 53 is the same as that of the second opening 23, and an aperture a of the first opening 53 is equal to an aperture b of the second opening 23.

In some embodiments, the aperture a of the first opening 53 is greater than or equal to 1 μm, and the aperture a of the first opening 53 is less than or equal to 4 μm.

Figure 7:
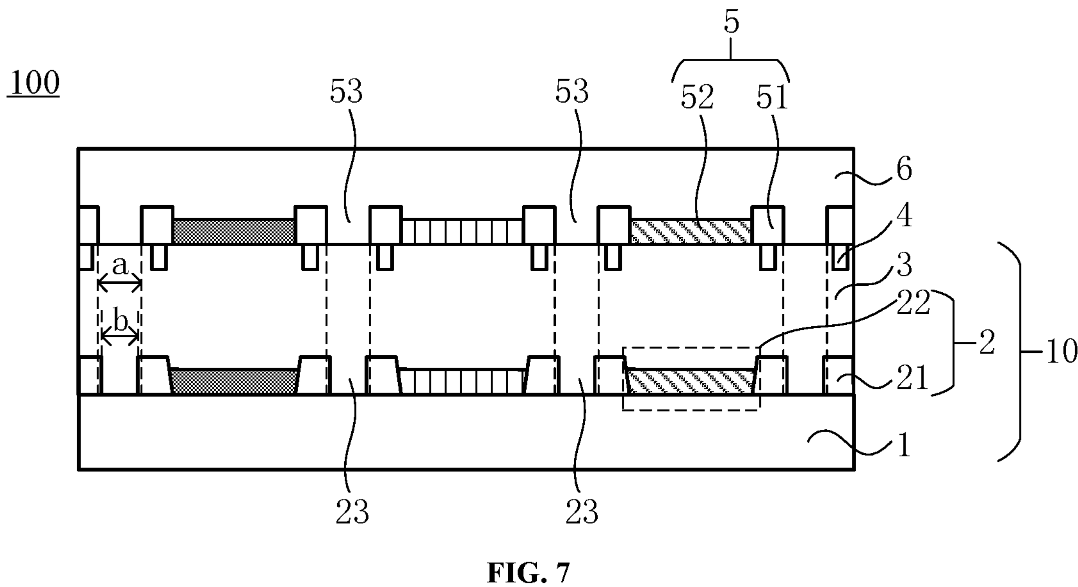
FIG. 7 is a hierarchical diagram of a photosensitive region of another display panel according to some embodiments of the present disclosure.

FIG. 7 is a hierarchical diagram of a photosensitive region of another display panel according to some embodiments of the present disclosure. As shown in FIG. 7, an orthographic projection of each second opening 23 onto the touch layer 4 is disposed within the orthographic projection of the corresponding first opening 53 onto the touch layer 4.

In this case, the aperture b of the second opening 23 is smaller than the aperture a of the first opening 53. The cross-sectional shape of the second opening 23 may be the same as or different from that of the first opening 53.

In some embodiments, the aperture a of the first opening 53 is greater than or equal to 1 μm, and the aperture a of the first opening 53 is less than or equal to 4 μm.

In some embodiments, the difference between the aperture b of the second opening 23 and the aperture a of the first opening 53 is 1 μm to 2 μm, for example, 1.6 μm.

The cross-sectional shapes of the first opening 53 and the second opening 23 may be circular, trapezoidal, triangular, polygonal, elliptical, or irregular, which is not limited in the embodiments of the present disclosure.

Figure 8:
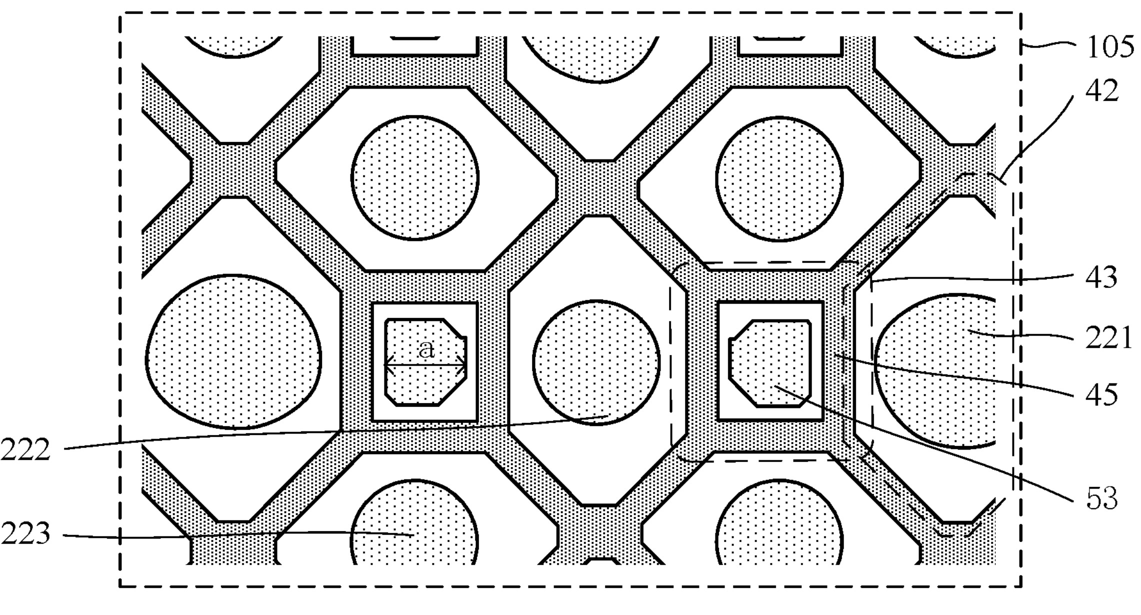
FIG. 8 is a top view of the photosensitive region of the display panel according to some embodiments of the present disclosure.

FIG. 8 is a top view of the photosensitive region of the display panel according to some embodiments of the present disclosure. As shown in FIG. 8, the mesh structure includes a plurality of first grids 42 and a plurality of second grids 43, and the plurality of second grids 43 are disposed in the photosensitive region 105. Orthographic projections of the first opening 53 and the corresponding second opening 23 onto the touch layer 4 are disposed in a region surrounded by the second grids 43, and each second grid 43 is disposed between every two adjacent first grids 42 and connected to the two adjacent first grids 42.

Since the photosensitive region 105 is designed with the first opening 53 and the second opening 23, the touch wires may cover the first opening 53 and the second opening 23 if the arrangement of the touch wires is not adjusted correspondingly. Therefore, the touch wires need to bypass the first opening 53 and the second opening 23 to form the second grid 43.

In some embodiments, the first grid 42 in the photosensitive region 105 is hexagonal. The hexagonal first grid 42 includes six sides sequentially connected end to end. The second grid 43 is rectangular, and the second grid 43 includes four sides sequentially connected end to end. The four sides of the second grid 43 are respectively in common with the sides of the four adjacent first grids 42. Here, the side of the grid refers to a section of touch wire surrounding the grid. Being in common means that the sides of two grids share the section of touch wire.

For example, as shown in FIG. 8, a first wire 45 of the second grid 43 is co-edged with the first grid 43 surrounding the first light-emitting unit 221.

In FIG. 8, the four sides of the second grid 43 are of equal widths. In some embodiments, the width of each side of the second grid 43 ranges from 3.4 μm to 3.6 μm.

Figure 9:
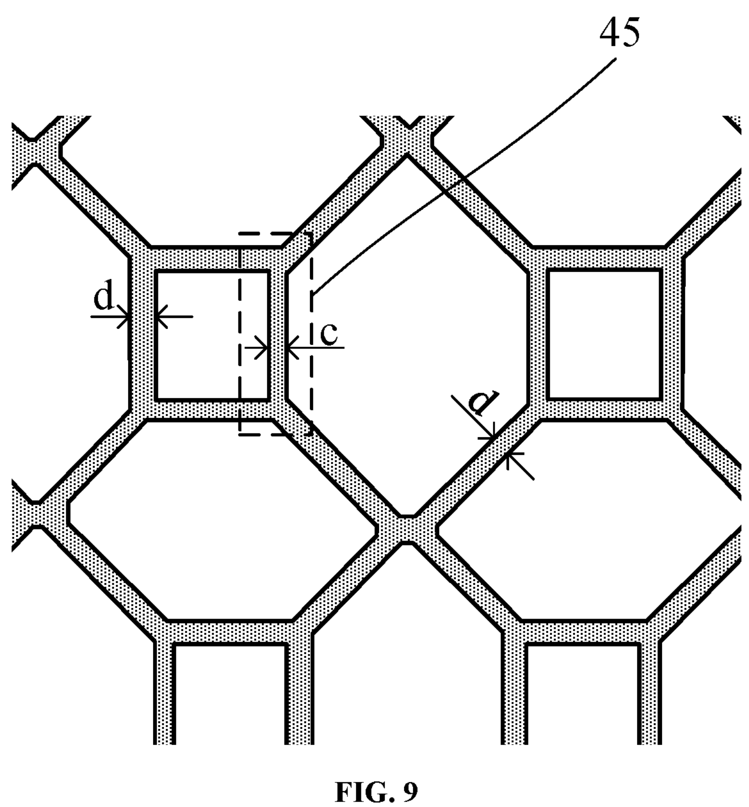
FIG. 9 is a schematic diagram of a touch layer in the photosensitive region of another display panel according to some embodiments of the present disclosure.

FIG. 9 is a schematic diagram of a touch layer in the photosensitive region of another display panel according to some embodiments of the present disclosure. The difference from the touch layer in FIG. 8 is that, as shown in FIG. 9, the width c of the first side 45 is smaller than the widths d of sides other than the first side 45 in the second grid 43. Since the first light-emitting unit 221 has a large light-emitting area, and the wiring space around the first light-emitting unit 221 is limited, the width c of the first side 45 disposed herein is reduced appropriately to adapt to the wiring space.

In some embodiments, the width c of the first side 45 of the second grid 43 ranges from 2.8 μm to 2.9 μm, and the widths of the sides of the second grid other than the first side 45 range from 3.4 μm to 3.6 μm.

Figure 10:
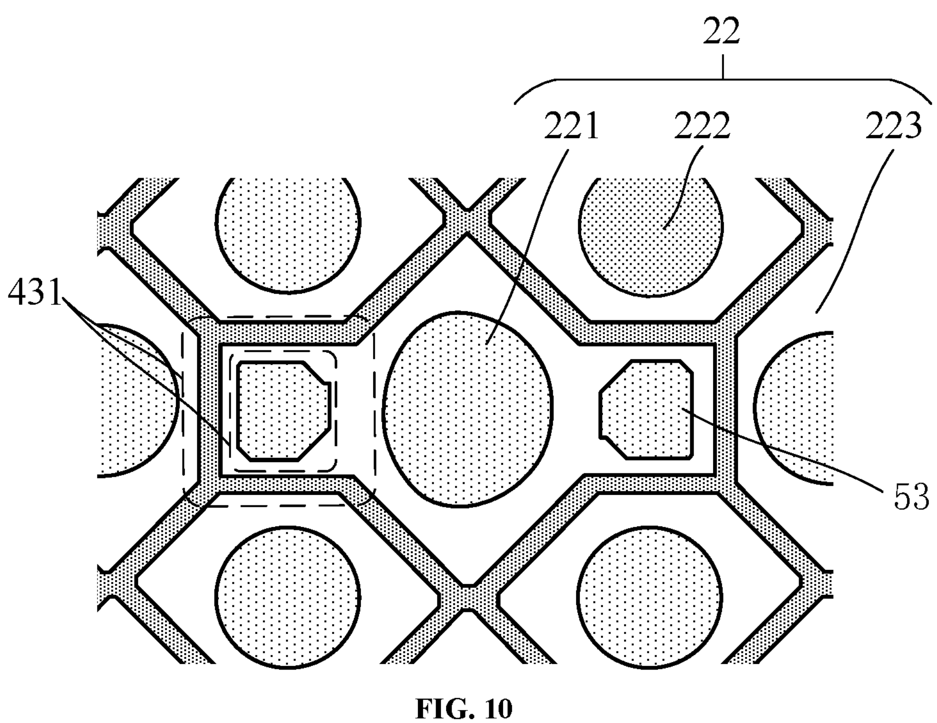
FIG. 10 is a top view of the photosensitive region of another display panel according to some embodiments of the present disclosure.

FIG. 10 is a top view of the photosensitive region of another display panel according to some embodiments of the present disclosure. As shown in FIG. 10, in the photosensitive region 105, the first grid 42 surrounding the first light-emitting unit 221 is hexagonal and has a group of opposite sides vacant, and the first grid 42 surrounding the second light-emitting unit 222 and the third light-emitting unit 223 takes the shape of a closed hexagon. The second grid 43 is rectangular and has one side vacant, and the vacant side of the second grid 43 is in common with the vacant side of the first grid 42.

That is, there is no touch wire between the first light-emitting unit 221 and the adjacent second opening 23. In this way, the second opening 23 is made as large as possible, and correspondingly, the first opening 53 is also made large, so that the transmittance of the display panel is further improved.

Figure 11:
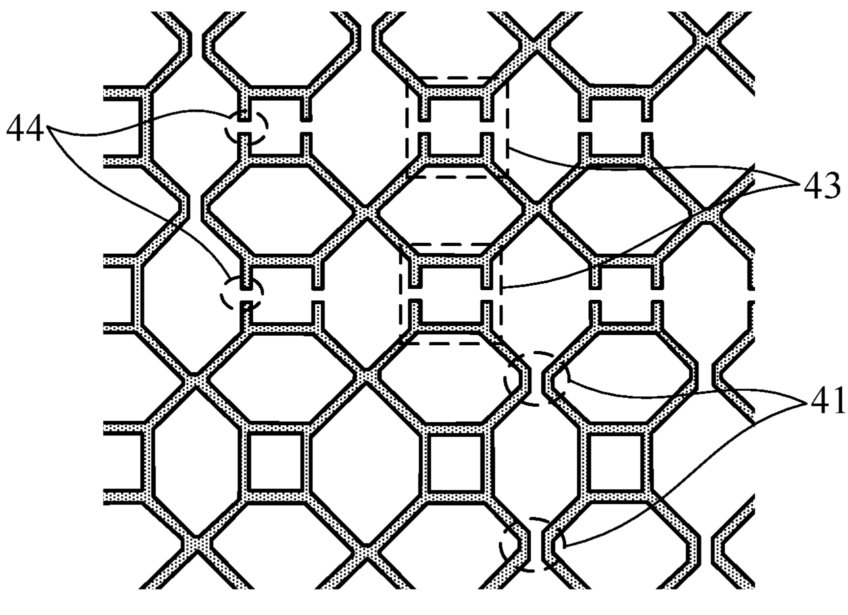
FIG. 11 is a schematic diagram of a touch layer in a photosensitive region of another display panel according to some embodiments of the present disclosure.

FIG. 11 is a schematic diagram of a touch layer in the photosensitive region of another display panel according to some embodiments of the present disclosure. In some embodiments, as shown in FIG. 11, at least part of the four sides of the second grid 43 are provided with second fractures 44, and the directions of the second fractures 44 are perpendicular to the extension directions of the sides where the second fractures 44 are disposed. The design of providing the second fractures on at least part of the sides of the second grid 43 can further reduce the proportion of metal and improve the transmittance of the display panel.

In the embodiments of the present disclosure, in the non-bendable region 120 outside the photosensitive region 105, the mesh structure is provided with a plurality of third fractures 46 (shown in FIG. 14) therein, and the plurality of third fractures 46 include at least one of the following fractures: a fracture of which the direction is parallel to the length direction x of the bendable region 110; a fracture of which the direction is perpendicular to the length direction x of the bendable region 110; a fracture of which the direction forms a non-90-degree included angle with the length direction x of the bendable region 110. When the fracture is parallel or perpendicular to the length direction x of the bendable region 120, the bending resistance of the product can be improved. Since the non-bendable region 120 does not need to be bent, in the third fracture, truncation directions of part of the second fractures may be parallel to, perpendicular to or form a non-90-degree angle with the length direction x of the bendable region 120, thus further reducing the area ratio of the touch wires and improving the transmittance of the display panel 100.

The structure of the touch layer may be explained below by taking the driving electrodes and the sensing electrodes arranged on the same layer as an example.

Figure 12:
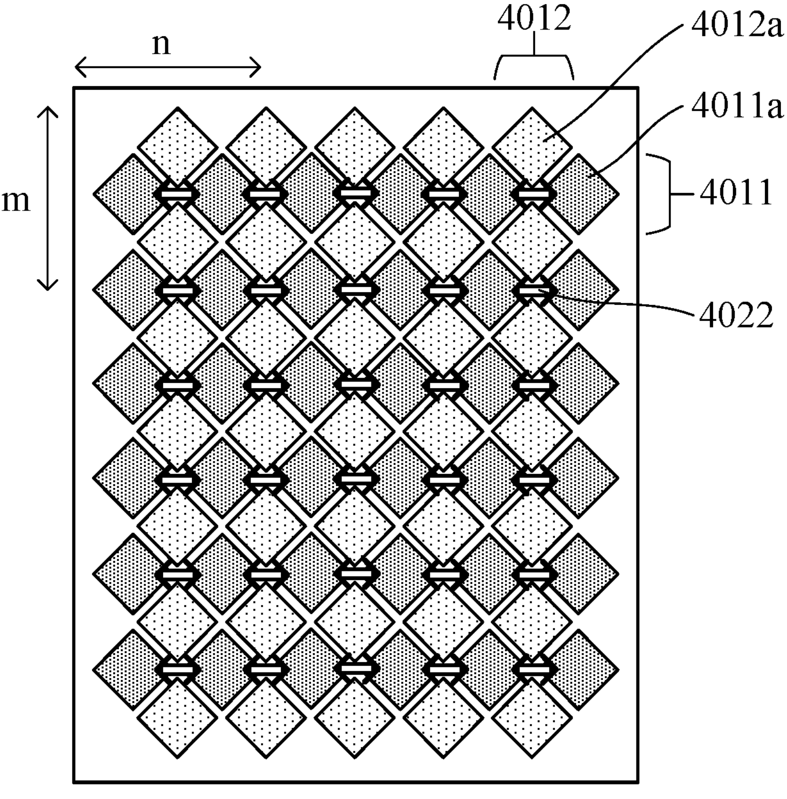
FIG. 12 is a schematic diagram of a positional relationship between a first touch electrode and a second touch electrode according to some embodiments of the present disclosure.

FIG. 12 is a schematic diagram of a positional relationship between a first touch electrode and a second touch electrode according to some embodiments of the present disclosure. As shown in FIG. 12, the touch layer 4 includes a plurality of first touch electrodes 4011 and a plurality of second touch electrodes 4012, insulated from each other, and a plurality of connection bridges 4022. The plurality of first touch electrodes 4011 and the plurality of second touch electrodes 4012 are disposed on the same layer, and the plurality of connection bridges 4022 are disposed on another layer. The plurality of first touch electrodes 4011 and the plurality of second touch electrodes 4012 are separated by at least part of the plurality of fractures. The display panel 100 has a first direction m and a second direction n that intersect, and the dimension of the display panel 100 in the first direction m is larger than that of the display panel 100 in the second direction n. The plurality of first touch electrodes 4011 are distributed in the first direction m. Each first touch electrode 4011 includes a plurality of first touch electrode blocks 4011*a*. The plurality of first touch electrode blocks 4011*a* are arranged in the second direction n. Every two adjacent first touch electrode blocks 4011*a* in the second direction n are connected by means of at least one connection bridge 4022. The plurality of second touch electrodes 4012 are distributed in the second direction n. Each second touch electrode 4012 includes a plurality of second touch electrode blocks 4012*a* and a plurality of connection lines 4012*b* (shown in FIG. 14). The plurality of second touch electrode blocks 4012*a* are arranged in the first direction m. Every two adjacent second touch electrode blocks 4012*a* in the first direction in are connected by means of at least one connection line 4012*b*. The first touch electrode block 4011*a* and the second touch electrode block 4012*a* are distributed in a cross array, which facilitates more accurate implementation of the touch function on the whole display panel.

It should be noted that FIG. 12 is only used to explain the positional relationship between the first touch electrode and the second touch electrode, and is not used to represent the real shapes of the first touch electrode and the second touch electrode. In fact, each block in FIG. 12 is a grid structure formed by a plurality of touch wires.

Figure 13:
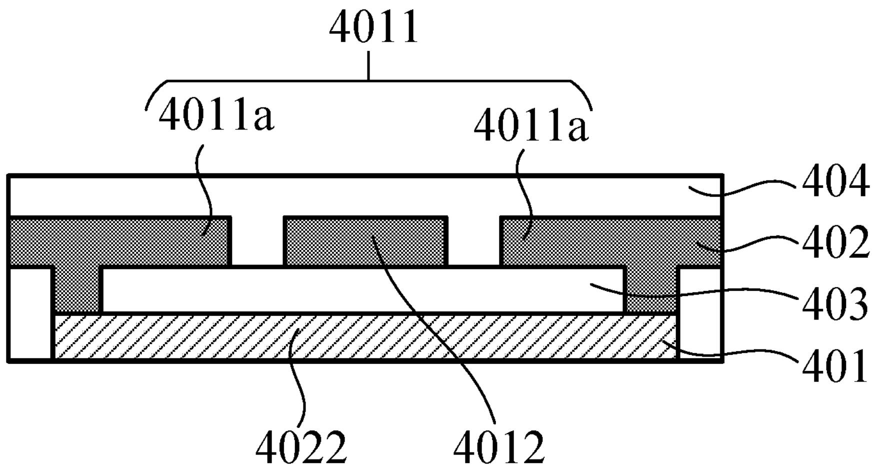
FIG. 13 is a schematic structural diagram of a touch layer according to some embodiments of the present disclosure.

FIG. 13 is a schematic structural diagram of the touch layer according to some embodiments of the present disclosure. As shown in FIG. 13, the mesh structure includes a first metal layer 401 and a second metal layer 402 laminated in sequence. The first metal layer 401 includes a plurality of connection bridges 4022, and the second metal layer 402 includes a plurality of first touch electrodes 4011 and a plurality of second touch electrodes 4012 insulated from each other.

In some embodiments, the touch layer 4 further includes an insulating layer 403 and a protection layer 404. The insulating layer 403 is disposed between the first metal layer 401 and the second metal layer 402, and the protection layer 404 is disposed on the side of the second metal layer 402 distal from the display substrate.

In some embodiments, the first touch electrode 4011 is a driving electrode and the second touch electrode 4012 is a sensing electrode. Alternatively, the first touch electrode 4011 is a sensing electrode and the second touch electrode 4012 is a driving electrode.

In some embodiments, the first direction m is parallel to the length direction x of the display panel 100.

In some embodiments, the first direction m is intersected with the length direction x of the display panel 100. In this case, an exemplary explanation may be made to the connection relationship between the first touch electrode and the second touch electrode as below.

Figure 14:
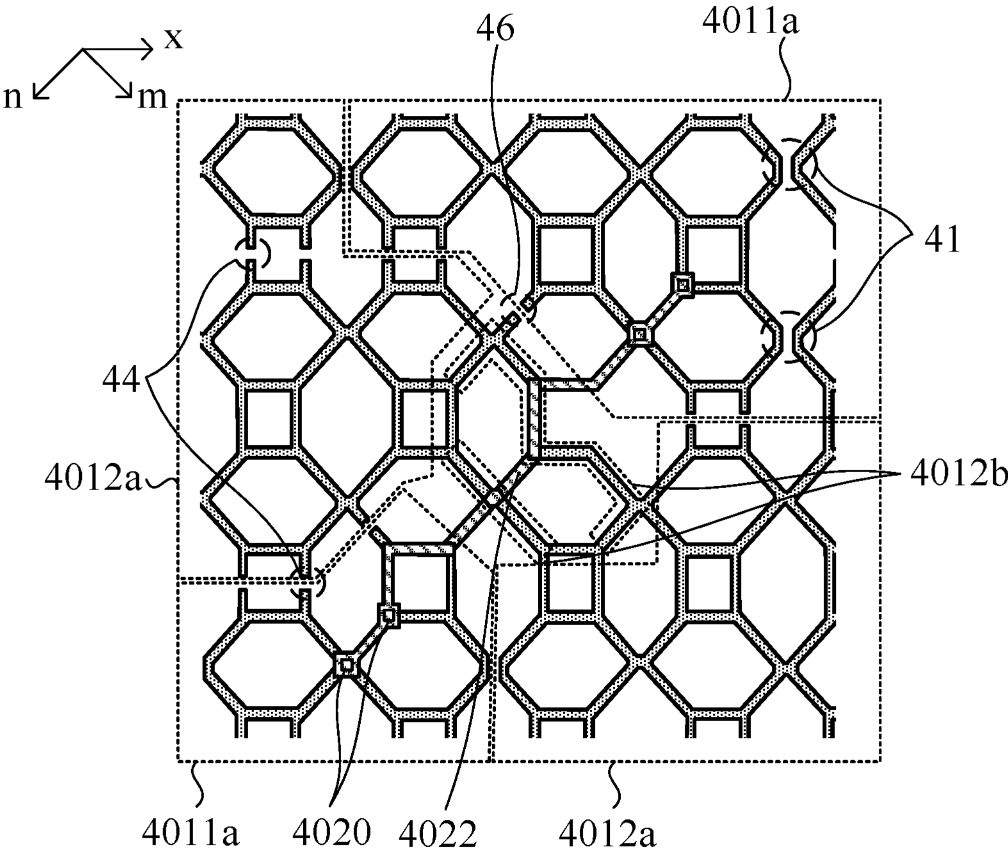
FIG. 14 is a schematic diagram of a connection relationship between a first touch electrode and a second touch electrode according to some embodiments of the present disclosure.

FIG. 14 is a schematic diagram of a connection relationship between the first touch electrode and the second touch electrode according to some embodiments of the present disclosure. As shown in FIG. 14, every two adjacent second touch electrode blocks 4012*a* are connected by means of two connection lines 4012*b*, and every two adjacent first touch electrode blocks 4011*a* are connected by means of the connection bridge 4022. Each connection bridge 4022 is intersected with and is insulated from the two connection lines 4012*b*. The first direction m is the length direction of the display panel 100. The longer the distance is, the higher the resistance of the touch wire is. The two second touch electrode blocks 4012*a* are connected by means of two connection lines 4012*b*, which can effectively reduce the resistance. Moreover, the stable connection between every two adjacent second touch electrode blocks 4012*a* can be ensured as much as possible to improve the reliability. The connection bridge 4022 may play the role of connecting two first touch electrode blocks 4011*a* across lines.

Alternatively, every two adjacent second touch electrode blocks 4012*a* are connected by means of more than two connection lines 4012*b*, which can further reduce the resistance.

In some embodiments, both ends of the connection bridge 4022 are connected to the first touch electrode block 4011*a* through at least two via holes 4020, which can improve the reliability of the connection.

It should be noted that in other possible embodiments, the display region 101 may include only a main display region 104 but not the photosensitive region 500. At this time, the display region 101 is not provided with the first opening 53 or the second opening 23. Accordingly, the touch layer 4 includes neither the second grid nor the second fracture 44. In both of the bendable region 110 and the non-bendable region 120, the touch layer 4 includes the first grid 42 surrounding the light-emitting unit 22. In the bendable region 110, the first grid 42 is provided with a plurality of first fractures 41, and the direction of the first fracture 41 is parallel or perpendicular to the length direction x of the bendable region 110. In the non-bendable region 120, the first grid 42 is provided with a plurality of third fractures 46, and the direction of the third fracture 46 is parallel to, or perpendicular to, or forms a non-90-degree angle with the length direction x of the bendable region 110.

Described above are merely optional embodiments of the present disclosure, and are not intended to limit the present disclosure. Within the spirit and principles of the present disclosure, any modifications, equivalent substitutions, improvements, and the like should fall within the scope of protection of the present disclosure.

What is claimed is:

1. A display panel, wherein the display panel is provided with a bendable region and a non-bendable region connected to the bendable region;

the display panel comprises a display substrate and a touch layer disposed on a side, proximal to a light-exiting side of the display panel, of the display substrate; and the touch layer comprises a plurality of touch wires intersected with one another to form a mesh structure, wherein the mesh structure is provided with a plurality of fractures, the plurality of fractures comprising a plurality of first fractures in the bendable region, truncation directions of the plurality of first fractures comprising at least one of following directions: a direction parallel to a length direction of the bendable region, and a direction perpendicular to the length direction of the bendable region;

the display panel further comprises a color film layer disposed on a side of the touch layer distal from the display substrate, and a black matrix of the color film layer is provided with a plurality of first openings therein; the display substrate further comprises a pixel definition layer provided with a plurality of second openings; the non-bendable region comprises a photosensitive region, the plurality of first openings and the plurality of second openings being both disposed in the photosensitive region and being in one-to-one correspondence; and an orthographic projection of each first opening onto the touch layer is respectively disposed within an orthographic projection of the second opening corresponding to the first opening onto the touch layer; and the display substrate comprises a plurality of light-emitting units, the mesh structure comprises a plurality of first grids and a plurality of second grids, and each of the first grids surrounds one of the plurality of light-emitting units, the plurality of second grids are disposed in the photosensitive region and are connected between every two adjacent first grids, orthographic projections of the first opening and the second opening corresponding to the first opening onto the touch layer are disposed within a region surrounded by the second grids.

2. The display panel according to claim 1, wherein the first fracture is disposed in at least one of following positions:

at an intersection of every two adjacent sides of the first grid, and between every two adjacent first grids in the length direction of the bendable region;

at an intersection of every two adjacent sides of the first grid, and between every two adjacent first grids in the direction perpendicular to the length direction of the bendable region; and at a middle of one side of the first grid.

3. The display panel according to claim 2, wherein the first fracture has two opposite fracture surfaces, and for the first fracture disposed at the intersection of every two adjacent sides of the first grid, an included angle between an extension direction of any one of the two adjacent sides and the fracture surface is an obtuse angle.

4. The display panel according to claim 1, wherein the first grids in the photosensitive region are all hexagonal, and the first grid of the hexagonal comprises six sides sequentially connected end to end; and the second grid is rectangular, and the second grid comprises four sides sequentially connected end to end, the four sides of the second grid being respectively in common with sides of the four adjacent first grids of the hexagonal.

5. The display panel according to claim 4, wherein the plurality of light-emitting units comprise a first light-emitting unit, a second light-emitting unit and a third light-emitting unit, a light-emitting area of the first light-emitting unit being larger than that of the second light-emitting unit and larger than that of the third light-emitting unit; and a first side of the second grid is in common with the first grid surrounding the first light-emitting unit, and in the second grid, a width of the first side is smaller than widths of sides of the second grid other than the first side.

6. The display panel according to claim 5, wherein in the second grid, the width of the first side ranges from 2.8 μm to 2.9 μm, and the widths of the sides of the second grid other than the first side range from 3.4 μm to 3.6 μm.

7. The display panel according to claim 5, wherein the first light-emitting unit is a blue light-emitting unit.

8. The display panel according to claim 4, wherein the four sides of the second grid are of equal widths.

9. The display panel according to claim 4, wherein the plurality of fractures further comprise a plurality of second fractures, the second fracture being disposed on at least part of the four sides of the second grid, a direction of the second fracture being perpendicular to an extension direction of the side where the second fracture is disposed.

10. The display panel according to claim 1, wherein the plurality of light-emitting units comprise a first light-emitting unit, a second light-emitting unit and a third light-emitting unit, a light-emitting area of the first light-emitting unit being larger than that of the second light-emitting unit and larger than that of the third light-emitting unit;

in the photosensitive region, the first grid surrounding the first light-emitting unit is hexagonal and has a group of opposite sides vacant, and the first grids surrounding the second light-emitting unit and the third light-emitting unit are hexagonal; and the second grid is rectangular and has one side vacant, and the vacant side of the second grid is in common with the vacant side of the first grid.

11. The display panel according to claim 1, wherein the plurality of fractures further comprise a plurality of third fractures disposed in the non-bendable region other than the photosensitive region, the plurality of third fractures comprising at least one of following fractures:

a fracture of which a fracture direction is parallel to the length direction of the bendable region;

a fracture of which a fracture direction is perpendicular to the length direction of the bendable region; and a fracture of which a fracture direction forms a non-90-degree included angle with the length direction of the bendable region.

12. The display panel according to claim 1, wherein the touch layer comprises a first metal layer and a second metal layer laminated in sequence;

the first metal layer comprises a plurality of first touch electrodes and a plurality of second touch electrodes, insulated from each other, the plurality of first touch electrodes and the plurality of second touch electrodes being separated by at least part of the plurality of fractures, and the second metal layer comprises a plurality of connection bridges;

the plurality of first touch electrodes are distributed in a first direction, each of the first touch electrodes comprises a plurality of first touch electrode blocks, the plurality of first touch electrode blocks are arranged in a second direction, and every two first touch electrode blocks adjacent to each other in the second direction are connected by means of one of the connection bridges; and the plurality of second touch electrodes are distributed in the second direction, each of the second touch electrodes comprises a plurality of second touch electrode blocks and a plurality of connection lines, the plurality of second touch electrode blocks are arranged in the first direction, and every two second touch electrode blocks adjacent to each other in the first direction are connected by means of at least two of the connection lines;

wherein the second direction is intersected with the first direction, and a dimension of the display panel in the first direction is larger than that of the display panel in the second direction.

13. A display apparatus, wherein the display apparatus comprises a display panel and a power supply circuit, the power supply circuit being configured to supply power to the display panel; and wherein the display panel is provided with a bendable region and a non-bendable region connected to the bendable region;

the display panel comprises a display substrate and a touch layer disposed on a side, proximal to a light-exiting side of the display panel, of the display substrate; and the touch layer comprises a plurality of touch wires intersected with one another to form a mesh structure, wherein the mesh structure is provided with a plurality of fractures, the plurality of fractures comprising a plurality of first fractures in the bendable region, truncation directions of the plurality of first fractures comprising at least one of following directions: a direction parallel to a length direction of the bendable region, and a direction perpendicular to the length direction of the bendable region;

the display panel further comprises a color film layer disposed on a side of the touch layer distal from the display substrate, and a black matrix of the color film layer is provided with a plurality of first openings therein; the display substrate further comprises a pixel definition layer provided with a plurality of second openings; the non-bendable region comprises a photosensitive region, the plurality of first openings and the plurality of second openings being both disposed in the photosensitive region and being in one-to-one correspondence; and an orthographic projection of each first opening onto the touch layer is respectively disposed within an orthographic projection of the second opening corresponding to the first opening onto the touch layer; and the display substrate comprises a plurality of light-emitting units, the mesh structure comprises a plurality of first grids and a plurality of second grids, and each of the first grids surrounds one of the plurality of light-emitting units, the plurality of second grids are disposed in the photosensitive region and are connected between every two adjacent first grids, orthographic projections of the first opening and the second opening corresponding to the first opening onto the touch layer are disposed within a region surrounded by the second grids.

14. The display apparatus according to claim 13, wherein the first fracture is disposed in at least one of following positions:

at an intersection of every two adjacent sides of the first grid, and between every two adjacent first grids in the length direction of the bendable region;

at an intersection of every two adjacent sides of the first grid, and between every two adjacent first grids in the direction perpendicular to the length direction of the bendable region; and at a middle of one side of the first grid.

15. The display apparatus according to claim 14, wherein the first fracture has two opposite fracture surfaces, and for the first fracture disposed at the intersection of every two adjacent sides of the first grid, an included angle between an extension direction of any one of the two adjacent sides and the fracture surface is an obtuse angle.

16. The display apparatus according to claim 13, wherein the first grids in the photosensitive region are all hexagonal, and the first grid of the hexagonal comprises six sides sequentially connected end to end; and the second grid is rectangular, and the second grid comprises four sides sequentially connected end to end, the four sides of the second grid being respectively in common with sides of the four adjacent first grids of the hexagonal.

* * * * *